(12) United States Patent
Hamza

(10) Patent No.: US 7,756,301 B2
(45) Date of Patent: Jul. 13, 2010

(54) IRIS RECOGNITION SYSTEM AND METHOD

(75) Inventor: Rida M. Hamza, Eagan, MN (US)

(73) Assignee: Honeywell International Inc., Morristown, NJ (US)

( * ) Notice: Subject to any disclaimer, the term of this patent is extended or adjusted under 35 U.S.C. 154(b) by 1084 days.

(21) Appl. No.: 11/043,366

(22) Filed: Jan. 26, 2005

(65) Prior Publication Data

US 2006/0165266 A1    Jul. 27, 2006

(51) Int. Cl.
*G06K 9/00*    (2006.01)
(52) U.S. Cl. ..................................... 382/117
(58) Field of Classification Search ................ 382/115, 382/117
See application file for complete search history.

(56) References Cited

U.S. PATENT DOCUMENTS

| | | | |
|---|---|---|---|
| 4,641,349 A | 2/1987 | Flom | |
| 5,291,560 A | 3/1994 | Daugman | |
| 5,572,596 A | 11/1996 | Wildes et al. | |
| 5,717,512 A | 2/1998 | Chmielewski, Jr. et al. | |
| 5,751,836 A | 5/1998 | Wildes et al. | |
| 5,901,238 A * | 5/1999 | Matsushita | 382/117 |
| 5,953,440 A | 9/1999 | Zhang et al. | |
| 5,978,494 A | 11/1999 | Zhang | |
| 6,005,704 A | 12/1999 | Chmielewski, Jr. et al. | |
| 6,021,210 A | 2/2000 | Camus et al. | |
| 6,028,949 A | 2/2000 | McKendall | |
| 6,055,322 A | 4/2000 | Salganicoff et al. | |
| 6,064,752 A | 5/2000 | Rozmus et al. | |
| 6,069,967 A | 5/2000 | Rozmus et al. | |
| 6,088,470 A | 7/2000 | Camus et al. | |
| 6,252,977 B1 | 6/2001 | Salganicoff et al. | |
| 6,289,113 B1 | 9/2001 | McHugh et al. | |
| 6,299,306 B1 | 10/2001 | Braithwaite et al. | |
| 6,307,954 B1 | 10/2001 | Suzaki | |
| 6,320,610 B1 | 11/2001 | Van Sant et al. | |
| 6,332,193 B1 | 12/2001 | Glass et al. | |
| 6,377,699 B1 | 4/2002 | Musgrave et al. | |
| 6,424,727 B1 | 7/2002 | Musgrave et al. | |
| 6,483,930 B1 | 11/2002 | Musgrave et al. | |
| 6,503,163 B1 | 1/2003 | Van Sant et al. | |
| 6,505,193 B1 | 1/2003 | Musgrave et al. | |
| 6,516,087 B1 | 2/2003 | Camus | |
| 6,532,298 B1 | 3/2003 | Cambier et al. | |
| 6,540,392 B1 | 4/2003 | Braithwaite | |
| 6,553,494 B1 | 4/2003 | Glass | |
| 6,614,919 B1 * | 9/2003 | Suzaki et al. | 382/117 |
| 6,753,919 B1 | 6/2004 | Daugman | |
| 6,856,696 B1 * | 2/2005 | Ajioka | 382/173 |
| 7,155,058 B2 * | 12/2006 | Gaubatz et al. | 382/167 |
| 7,190,843 B2 * | 3/2007 | Wei et al. | 382/274 |
| 2002/0154794 A1 | 10/2002 | Cho | |
| 2004/0193893 A1 | 9/2004 | Braithwaite et al. | |
| 2005/0008200 A1 | 1/2005 | Azuma et al. | |

* cited by examiner

*Primary Examiner*—Brian Q Le
(74) *Attorney, Agent, or Firm*—Schwegman, Lundberg & Woessner P.A.

(57) ABSTRACT

An identification method includes acquiring an image of an eye, approximating the center of the pupil, using the approximated center of the pupil as the origin of a polar coordinate system, segmenting the image of an iris portion of the eye along a radial at an angle, and normalizing a number of data points from the iris portion along the radial at an angle.

39 Claims, 7 Drawing Sheets

IRIS RECOGNITION SYSTEM AND METHOD

BACKGROUND

Identification of humans is a goal as ancient as humanity itself. As technology and services have developed in the modern world, human activities and transactions have proliferated in which rapid and reliable personal identification is required. Examples include passport control, computer login control, bank automatic teller machines and other transactions authorization, premises access control, and security systems generally. As always, identification that is speedy, reliable, and automated is desired over slower, less reliable and manual identification procedures.

The use of biometric indicia for identification purposes requires that a particular biometric factor be unique for each individual, that it be readily measured, and that it be invariant over time. Although many indicia have been proposed over the years, fingerprints are perhaps the most familiar example of a successful biometric identification scheme. As is well known, no two fingerprints are the same, and they do not change except through injury or surgery. It is equally clear, however, that identification through fingerprints suffers from the significant drawback of requiring physical contact with the person. No method exists for obtaining a fingerprint from a distance, nor does any such method appear likely.

More recently, the iris of the human eye has been used as a biometric indicator for identification. The pattern of an iris is complex and can contain many distinctive features such as arching ligaments, furrows, ridges, crypts, rings, corona, freckles, a zigzag collaret, and other distinctive features. The iris of every human eye has a unique texture of high complexity, which is essentially stable over a person's life. No two irises are identical in texture or detail, even in the same person. As an internal organ of the eye, the iris is well protected from the external environment, yet it is easily visible even from yards away as a colored disk, behind the clear protective window of the eye's cornea, surrounded by the white tissue of the eye. Although the iris stretches and contracts to adjust the size of the pupil in response to light, its detailed texture remains largely unaltered apart from stretching and shrinking. Such distortions in the texture can readily be reversed mathematically in analyzing an iris image, to extract and encode an iris signature that remains the same over a wide range of pupillary dilations. The richness, uniqueness, and immutability of iris texture, as well as its external visibility, make the iris suitable for automated and highly reliable personal identification. The registration and identification of the iris can be performed using a video-camera without any physical contact, automatically and unobtrusively.

BRIEF DESCRIPTION OF THE FIGURES

Embodiments of the present invention are illustrated by way of example and not limitation in the Figures of the accompanying drawings in which.

DETAILED DESCRIPTION

Figure 1:
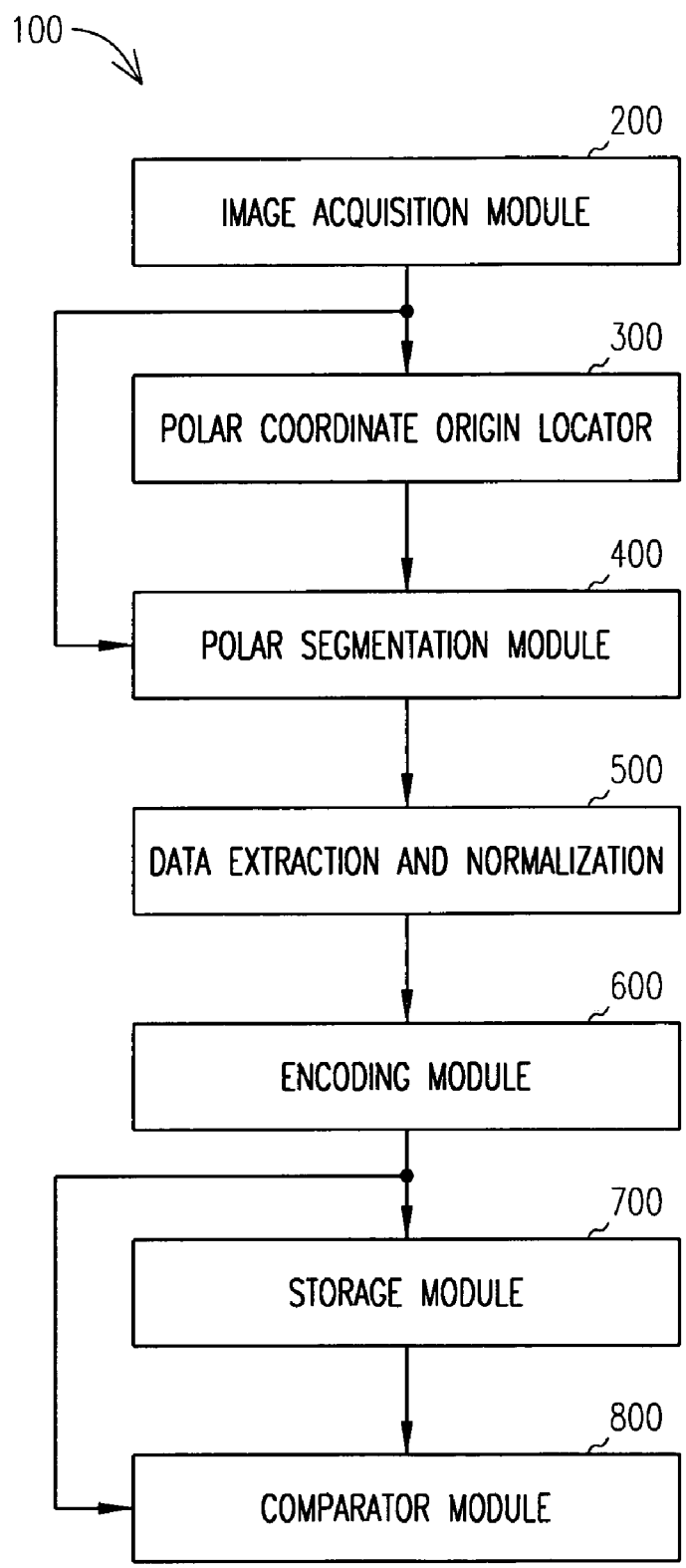
FIG. 1 is a diagram illustrating an overall structure of a iris recognition system, according to an example embodiment.

A system and method for selecting configuration results from a plurality of candidate configuration designs are described herein. In the following description, numerous specific details are set forth. The following description and the drawing figures illustrate aspects and embodiments of the invention sufficiently to enable those skilled in the art. Other embodiments may incorporate structural, logical, electrical, process, and other changes; e.g., functions described as software may be performed in hardware and vice versa. Examples merely typify possible variations, and are not limiting. Individual components and functions may be optional, and the sequence of operations may vary or run in parallel. Portions and features of some embodiments may be included in, substituted for, and/or added to those of others. The scope of the embodied subject matter encompasses the full ambit of the claims and substantially all available equivalents.

This description of the embodiments is divided into several sections. In the first section, an embodiment of a system-level overview is presented. In the second section, methods for using example embodiments and example embodiments are described. In the third section, an embodiment of a hardware and operating environment is described.

System-Level Overview

This section provides a system level overview of example embodiments of the invention.

FIG. 1 is a schematic diagram illustrating a personal identification system, such as an iris recognition system 100, according to an embodiment of this invention. The iris recognition system 100 includes a image acquisition module 200 communicatively coupled to a polar coordinate origin locator 300. The iris recognition system 100 also includes a polar segmentation module 400 communicatively coupled to a data extraction and normalization module 500. The iris recognition system 100 also includes an encoding module 600 that is communicatively coupled to the data extraction and normalization module 500 and a storage module 700. The iris recognition system 100 also includes a comparator module 800 that is communicatively coupled to the storage module 700.

In operation, the image acquisition module 200 acquires an image of an eye. The image acquired can show the entire eye or a portion of the eye. The image acquired can also be directed toward the human face or can be obtained at an angle from one side of the nose or from one side of the face. An image includes at least a portion of an iris, a portion of a pupil, and a portion of the sclera of an eye of an animal, such as a human. The sclera is also commonly referred to as the white of the eye. Once an image is acquired, an image output 290 is provided to the polar coordinate origin locator 300. The polar coordinate origin locator 300 analyzes the acquired image and determines an origin for a polar coordinate system within the image. In one example embodiment, the origin for the polar coordinate system is located within the portion of the acquired image corresponding to the pupil of the eye. The polar coordinate origin locator 300 provides the location of the origin 390 to the polar segmentation module 400. The polar segmentation module 400 also is provided with the acquired image 290 from the image acquisition module 200.

The polar segmentation module 400 segments the iris portion of the image along at least one radial having an endpoint at the location of the pupil origin 390. In some embodiments, the polar segmentation module 400 segments the iris portion of the image along a plurality of radials each having an endpoint at the location of the origin 390. Each polar segment includes data from the acquired image related to the pupil, the iris, and the sclera as well as the boundaries between these portions of the eye. In some embodiments, the data is image data. The plurality of polar segments can be taken at a predetermined angles about the origin. The predetermined angles can be any set number of degrees apart from one another. In other embodiments, a number of segments are taken from an incomplete image of the eye. For example, in security screening situations, images of the eye may be occluded as certain people look away or put up a hand to cover part or all of their eye. The polar segmentation module 400 sends an output 490 of data associated with each polar segment to the data extraction and normalization module 500. In the data extraction and normalization module 500, the data associated with the iris of the eye is isolated on each polar segment. The number of data points associated with the iris portion of the segment is normalized so that the same number of data points are associated with an iris portion for each polar segmentation of the eye. Once the data related to the iris is extracted and normalized, the iris data is encoded in the encoding module 600. The encoding module converts the polar image into a numeric code that can be manipulated to be either stored or compared to other stored iris codes. The encoded iris data 690 can be sent to a storage module 700.

This is the case if the encoded iris data is a sample that is to be stored for comparison to other encoded iris data. The encoded iris data 690 can also be sent to a comparator module 800. The comparator module 800 compares the encoded iris data 690 to previously saved encoded iris data and looks for a match or a probable match.

As shown, each of the modules discussed above can be implemented in software, hardware or a combination of both hardware and software. Furthermore, each of the modules can be implemented as an instruction set on a microprocessor associated with a computer system or can be implemented as a set of instructions associated with any form of media, such as a set of instructions on a disk drive, a set of instructions on tape, a set of instructions transmitted over an Internet connection or the like.

Methods of Embodiments

This section describes methods performed by embodiments of the invention.

In certain embodiments, the methods are performed by machine-readable media (e.g., software), while in other embodiments, the methods are performed by hardware or other logic (e.g., digital logic). In this section, FIGS. 2-8 will be discussed.

Figure 2:
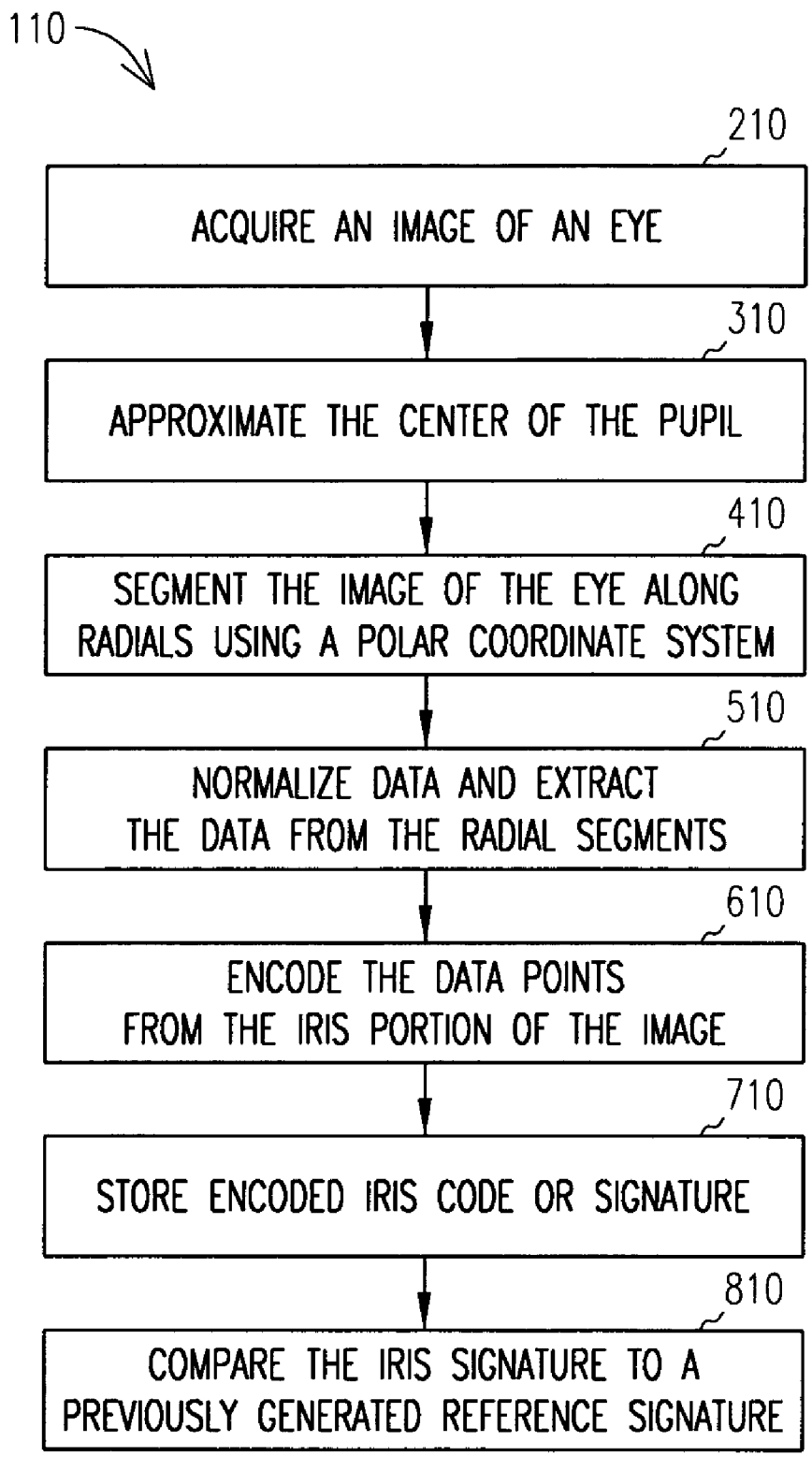
FIG. 2 is a flow diagram illustrating a method for iris recognition, according to an example embodiment.

FIG. 2 is a flow chart of an identification method 110, such as the iris recognition method, according to one example embodiment. The identification method 110 includes acquiring an image of an eye 210, and approximating the center of the pupil 310. The iris portion of the image, in some embodiments, may be substantially non circular. In other example embodiments, a substantial portion of the iris portion of the image is occluded. Using the approximated center of the pupil as the origin of a polar coordinate system, the image of the eye is then segmented 410. In one example embodiment, the image of an iris portion of the eye is segmented along a radial at an angle. The method 110 also includes normalizing a number of data points from the iris portion along the radial at an angle and extracting the data 510. The method 110 also includes analyzing data points from the iris portion of the radial at an angle. In one example embodiment, this data is used to generate an iris signature associated with the data points from the iris portion. In some embodiments, generating an iris signature further comprises encoding the data points from the iris portion of the image 610. [In still other embodiments, encoding the data points from the iris portion includes weighting at least one of a number of bits associated with the data points from the iris portion.] When converting an iris polar image into a numeric code we use multiple bits to present the intensity value of each pixel within the iris polar image. The code used to represent these values is constructed using 2 or more bits. The most significant bits are weighted. Weighting places significance on most significant bits than the rest of detailed bits (least significant bits). The method 110 also includes comparing the iris signature to a previously generated reference iris signature 110. In these embodiments, the encoded iris signature is compared to a previously generated and encoded reference iris signature. The identification method 110 set forth above is an overview of the entire process. Example embodiments of the method 110 will be discussed below.

Figure 3A:
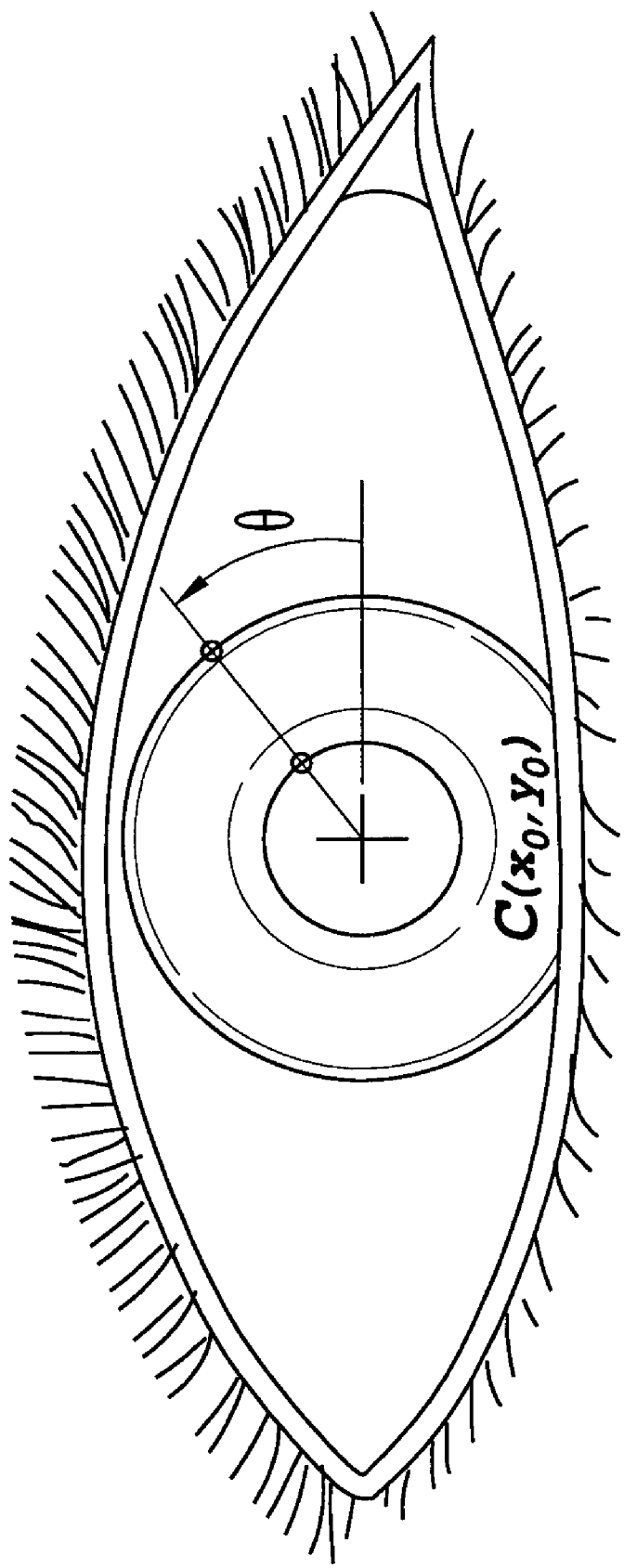
FIG. 3A is an acquired image for use in an example embodiment of the iris recognition method.
Figure 3B:
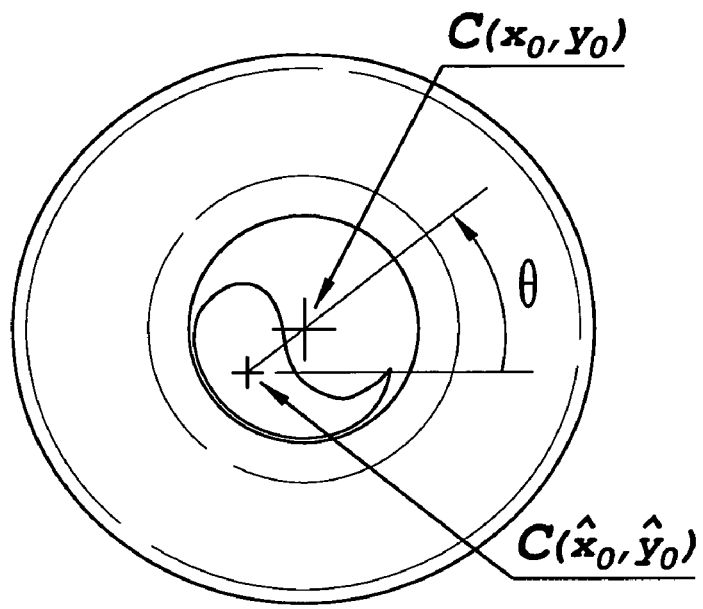
FIG. 3B is an acquired image for use in another example embodiment of the iris recognition method.
Figure 3C:
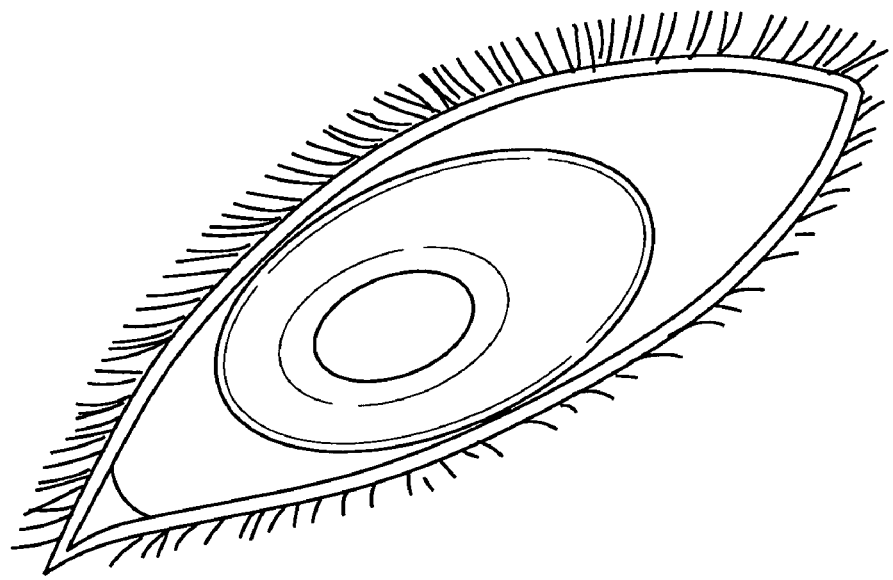
FIG. 3C is an acquired image for use in an example embodiment of the iris recognition method.

FIGS. 3A-3C are acquired images for use in various example embodiments of the iris recognition method. FIG. 3A is an acquired image gathered at a selected distance and from the front of the iris. This is an image from a cooperative person. FIG. 3B is an acquired image that has been modified to show some of the data points used in locating the center of the iris, which will be discussed in further detail below. FIG. 3C is also an acquired image for use in an example embodiment of the iris recognition method. This image is less than perfect and is the type of image that is acquired from an uncooperative person or form a camera positioned at a security checkpoint, such as at an airport. In the image of FIG. 3C, the iris is irregular and is actually from the side and is an oblong elliptical shape. The iris recognition method works on many sorts of images, including those that are less than perfect. The iris recognition method also works on images that are occluded or do not include a full image of the eye. In short, the method and analysis can be applied to all types of images, including images acquired that have other irregular shapes for the eye, as well as other deviated shapes and distorted shapes, acquired at various distances and angles with respect to the eye.

Figure 4:
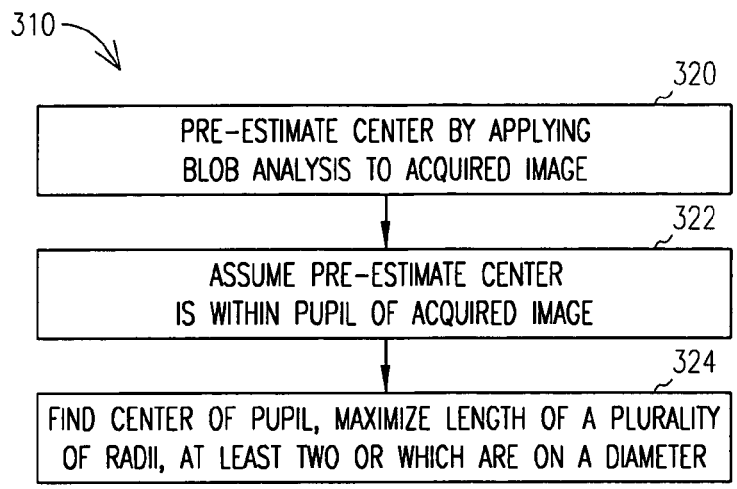
FIG. 4 is a flow diagram illustrating a method for locating the origin in an acquired image, according to one example embodiment of the iris recognition method.

FIG. 4 is a flow diagram illustrating a method 310 for locating the origin in an acquired image, according to one example embodiment of the iris recognition method. The method 310 includes pre-estimating the center of a region of interest 320, assuming the pre-estimate center is within the pupil of the acquired image 322 and finding the center of the pupil 324. Approximating the center of the pupil further includes identifying the pupil of the eye as a blob region, and finding the center of mass of the blob region. In some embodiments, the method includes determining the radial distance between the center of mass of the blob region and a boundary of a pupil at a plurality of angles, and adjusting from the center of mass to a center of the pupil. The center of the pupil is selected to minimize differences in the radial distance between the center of the pupil and the boundary of the pupil at the plurality of angles. In still other embodiments, segmenting the image of an iris portion of the eye along a radial at an angle, and normalizing a number of data points from the iris portion along the radial at an angle occur substantially simultaneously.

Acquiring an image of an eye, in some embodiments, includes acquiring an image where the iris is deformed. The iris portion of the image, in some embodiments, may be substantially non circular or, in some instances, a substantial portion of the iris portion of the image is occluded.

As mentioned above, one embodiment of the method includes pre-estimating the center by applying a blob analysis to the acquired image 320. During the pre-estimation analysis, the boundaries of the iris are not approximated as circles or ellipses or other regular shapes. This allows the analysis to be applied to all types of images, including images acquired that have other irregular shapes for the eye. The analysis can be applied to other deviated shapes and distorted shapes.

The blob analysis for pre-estimation of the center 320 of the iris includes the following. Assume that $\rho(x,y)$ is a continuous density function on the blob region R as a function of the intensity function of the image. Then the center of mass is defined by the following equation:

$$C(\hat{x}_o, \hat{y}_o) = \left(\frac{m_x}{M}, \frac{m_y}{M}\right)$$

Where M is the mass within the blob, and the moments of mass on both axes are $$m_x = \int_R \int \rho(x, y) y\, dx\, dy;\ \&\ m_y = \int_R \int \rho(x, y) x\, dx\, dy; \quad (1)$$

The blob analysis measures or approximates only the center of one region, such as the region bounded by the pupillary boundary. It is unnecessary to determine more that one boundary to determine the center since the analysis does not rely on exact measurements of centers of boundary between the pupil and the iris, and the boundary between the iris and the sclera. The blob analysis yields a pre-estimate of the center of the pupil. The blob analysis will not lead to an accurate center of the pupil. Additional steps and analysis, which are described in further detail below, are preformed to extract the exact center of the inner iris ellipse or pupil.

The pre-estimated center, $C(x_o,y_o)$ is assumed to be within the pupil circle 322. The pre-estimated center is used to find substantially the center of the pupil 324 on the acquired image. In essence, several radials having an endpoint at the pre-estimated center are analyzed to find the boundary between the pupil and the iris. The lengths of the lines between the pre-estimated center and the pupillary boundary on each of the radials are then substantially equalized. In so doing, a more accurate center of the pupil is determined. In another embodiment, the following analysis yields a center substantially closer to the actual center of the pupil. The radius from the actual center of the iris is related to the pre-estimated center as follows:

$$r(\theta) = \text{Radius w.r.t. } C(\hat{x}_o, \hat{y}_o) \quad (2)$$

Thus, $$x_o = \hat{x}_o + \Delta r(\theta_o)\cos(\theta_o)$$

And $$y_o = \hat{y}_o + \Delta r(\theta_o)\sin(\theta_o)$$

Where, $$\Delta r(\theta_o) = \underset{\theta}{\arg\max}\left(\frac{r(\theta) - r(\theta + \pi)}{2}\right)$$

In some embodiments, the acquired image of the eye has a non-deformed iris shape (i.e. perfect circles). One such instance is when a reference image is acquired and a set distance with a cooperative individual. When an acquired image has a substantially non-deformed iris, the equations above can be simplified to the following:

$$x_o = \frac{(r_0(x, 0) + r_\pi(x, 0))}{2}$$

And $$y_o = \frac{\left(r_{-\frac{\pi}{2}}(0, y) + r_{\frac{\pi}{2}}(0, y)\right)}{2}$$

Figure 5:
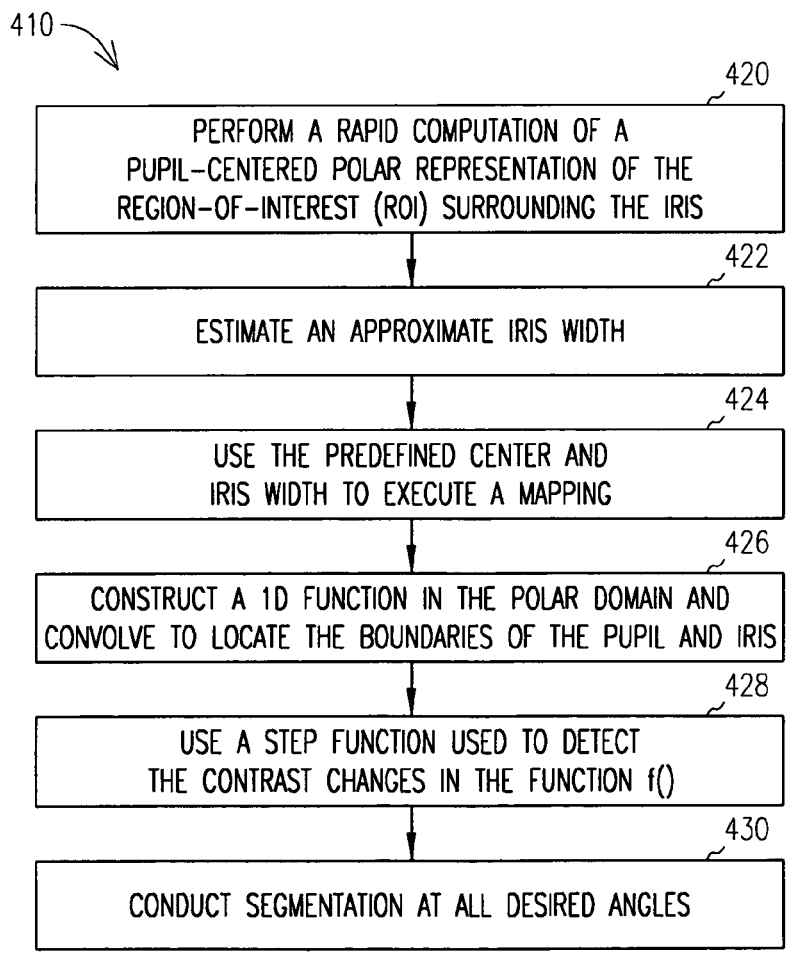
FIG. 5 is a flow diagram illustrating a method for determining penalty costs associated with a selected candidate configuration result, according to an example embodiment.

FIG. 5 is a flow diagram illustrating a method 410 for polar segmentation, according to an example embodiment. The method 410 includes performing a rapid computation of a pupil-centered polar representation of the region-of-interest (ROI) surrounding the iris 420, estimating an approximate iris width 422 to be over stretched, using the predefined center and iris width to execute a mapping 424, constructing a 1D function in the polar domain and convolving the same to locate the boundaries of pupil and iris 426, using a step function used to detect the contrast changes in the function $f(\ )$ 428, and conducting segmentation at all desired angles 430.

As an overview of one example embodiment, the segmentation process is simplified since mapping is accomplished by switching to a polar domain at an early stage. Segmentation is then done in a polar domain using 1D analysis procedure. The analysis is conducted only on a subsection of the image surrounding the iris. A rapid polar conversion from an approximate center permits a fast 1D segmentation in polar domain. As discussed in more detail below, polar segmentation (POSE) yields rapid extraction of the apparent pupil and iris boundaries using one dimension signal processing. The analysis detects all kind of boundaries, including irregular and non-elliptic boundaries. For example, the analysis detects geometrically and biologically distorted images which are acquired at the image acquisition module 200. The approach handles any line-of-sight boundaries at the far side of a significantly rotated head, eye, and/or iris.

Initially, a rapid computation of a pupil-centered polar representation of the region-of-interest (ROI) surrounding the iris is made, as depicted by reference number 420. The ROI is mapped to the polar domain with respect to the estimated pupil center $C(x_o, y_o)$:

$$I_R(x, y) \xrightarrow{C(x_O, y_O)} I_R(0, r)$$

Based upon the predefined/estimated center, an estimate an approximate iris width is made, as depicted by reference number 422. Then the predefined center and iris width is used to execute the mapping 424 before executing an actual segmentation. FIG. 3A shows an image of an eye showing the referenced parameters that are used to map the image domain to the polar domain, according to an example embodiment of the invention.

A 1D function in the polar domain, is then convolved to locate the boundaries of pupil and iris 426. The analytical 1D function is defined at each angle as a function of the radius variable, r:

$$f_\theta(r) = \frac{1}{\Delta r \Delta \theta} \int\int_{\Delta r, \Delta \theta} I_R(\theta, r) d\theta dr \qquad (3.a)$$

In another embodiment, the $\Delta r$, $\Delta \theta$ can be set to 1 increment. Thus $f_\theta(r) = I_R(\theta, r)$. The estimated location of the iris with respect to the center $C(x_o, y_o)$ is computed as follows:

$$r_{iris}, r_{pupil} = \max_{r_k}\{f_\theta(r) \otimes u(r)\} \qquad (3.b)$$

Where u(r) is a step function used to detect the contrast changes in the function $f(r)$.

Figure 6:
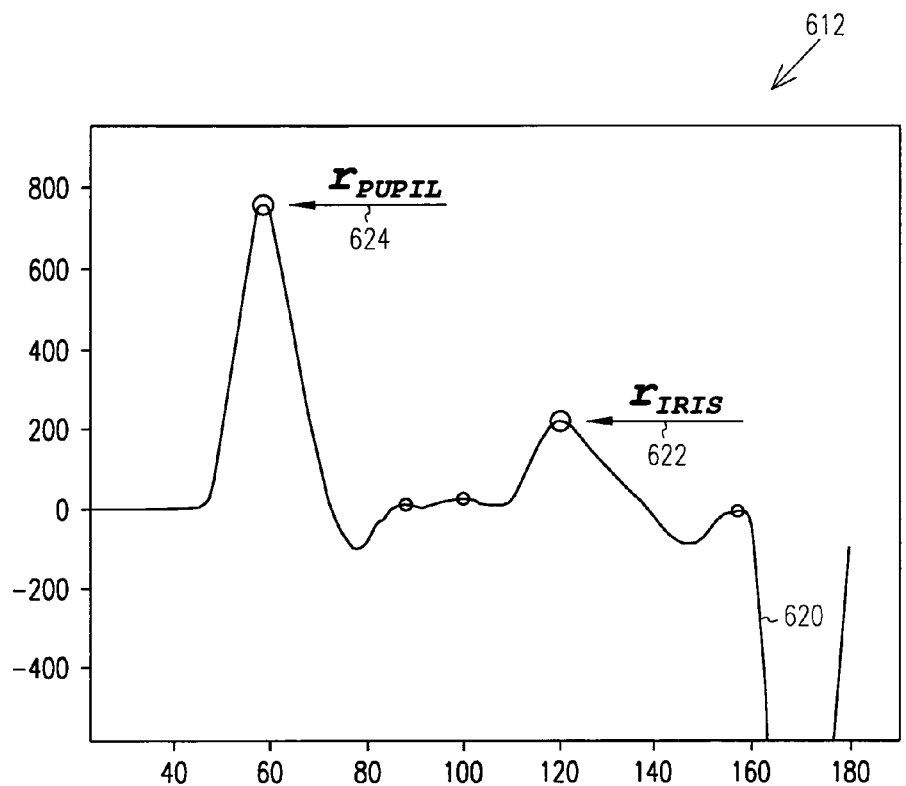
FIG. 6 is a step function based on contrast changes for detection of the boundary between a pupil and the iris, and the boundary between the iris and the sclera in an image of an eye, according to an example embodiment of the invention.

FIG. 6 is a graph 612 of the outcome of the convolution function (contrast derivative) of equation 3.b which indicates clearly contrast changes for detection of the boundary between a pupil and the iris, and the boundary between the iris and the sclera in an image of an eye, according to an example embodiment of the invention. The graph 612 of the convolution outcome function 620 is shown in FIG. 6, according to an example embodiment. The graph 612 is a plot of the contrast derivative (y-axis) verses the distance (x-axis) along a radial. As shown, there is a sharp difference in contrast at the boundary of the pupil, as depicted by a point 624 of the function 620, and another sharp difference in contrast at the boundary of the iris and the sclera, as depicted by a point 622 of the step function 620. The data between these two points 622 and 624 on a radial or ray is the data associated with the iris.

Figure 7:
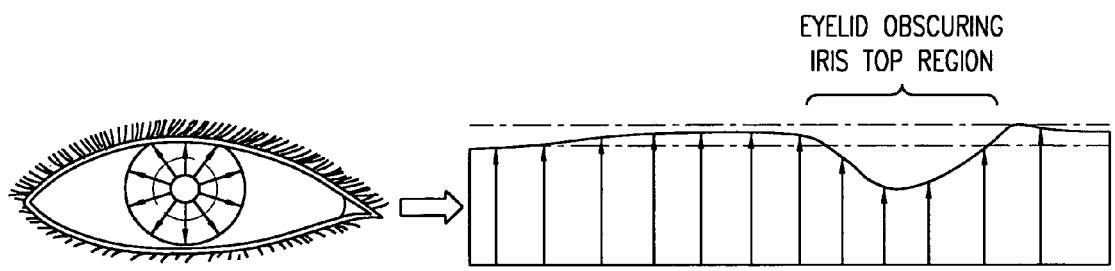
FIG. 7 is an image of an eye showing an occlusion due to a portion of the eye, such as an eyelid, according to an example embodiment.

FIG. 7 is an image of an eye showing an occlusion due to a portion of the eye, such as an eyelid, according to an example embodiment. As shown in FIG. 7, the eyelids and/or eyelashes obscure some of the iris annular region. Rather than isolating the obscured region by first detecting the edges of the eyelids/eyelashes by fitting multiple linear/nonlinear curvatures/lines and treating these obscurations as noise treating, or using Gabor filters and thresholding on variance of intensities and connectivity criterion so that estimated curvatures lead to connected points of eyelash representation, the affected portion of the iris are isolated or eliminated. An expected length of a radian, based on the median value of the estimated segments, is compared to an actual length of affected areas of the iris. When the expected length is within a range of the actual length, the radial yields data that is less likely to be noisy or include distortions. When the expected length compared to the actual length is outside a selected range, the radial yields data that is more likely to be free of noise or other distortions. In one example embodiment, the expected length of the radius segment or width of the iris is compared to the actual length of the radius segment or width of the iris to determine whether the data associated with the radial segment is more likely to be noise and distortion free. If there is a significant reduction in measured width, then the data will be treated as noisy and can be treated separately.

In one example embodiment, an eyelid occlusions is handled by masking all the corresponding pixels at the affected angles. This approach may exclude pixels crucial for discriminating among iris signatures or codes. In another example embodiment, the affected region of the iris is masked or removed. The region captured in FIG. 7, under the eyelid that occludes the top portion of the iris is accounted for by normalizing the unoccluded portion of the region based on the expected width value. The expected width value is the median value of the width measurements of the iris. As a result, only the pixels that correspond to the occluded portion of the iris underneath the eyelid are masked out as shown in FIG. 7.

As mentioned above, the method also includes normalizing a number of data points from the iris portion along each of the plurality of radials 510. Normalizing the data includes analyzing a number of data points associated with the iris portion of the radial. The number of data points for each of a set of samples is equalized for different samples across the portion of the radial associated with the iris portion. With each sample having the same number of data points, the normalized data is used to generate an iris signature associated with the data points from the iris portion. The iris signature is compared to a previously generated reference iris signature, in some embodiments of the invention. Generating an iris signature, in some embodiments, further includes encoding the data points from the iris portion. In still other embodiments, the method also includes normalizing a number of data points from the iris portion along the radial at an angle.

In some embodiments, radially segmenting the iris portion of the image along a radial 410, and normalizing a number of data points from the iris portion along the radial 510 occurs substantially simultaneously for a particular radial. The method may also include creation of an identifier from a set of data associated with the iris portion of an image from one or more of the plurality of radials. In some embodiments, creation of the identifier includes encoding a set of data associated with the iris portion of an image 610 from one or more of the plurality of radials. In some embodiments, selected portions of a set of data associated with the iris portion of an image from one or more of the plurality of radials are weighted to create the identifier. In some embodiments, establishing an origin of a polar coordinate system within the pupil of the image includes substantially centering the origin within the pupil of the image.

For the purpose of achieving more accurate recognition results, it is necessary to correct for the shape deformation and bring uniformity into the shape of the iris before we pass the polar data into the encoding scheme. Normalization preserves the discriminating features of a deformed iris and places the discriminating features into a new presentation that can be compared to other samples, such as reference signatures that are previously captured. Normalization is a way to assure that the same number of data points are obtained for an iris portion of an eye from an image so that the discriminating features of the iris along a radial are captured using substantially the same number of data points. Using a normalization scheme, the number of data points associated with the iris portion of a reference iris segment of an iris can be found when acquiring the image. The structure of the iris expands or contracts, but through normalization, the same number of data points may be obtained and the data points can be associated with the same or substantially the same portion of an acquired radial.

There are several major artifacts that result in deformation of the iris circular shape that require a normalization scheme to allow mapping the iris pixels into the polar presentation. Range differences result in acquired images having eyes and irises of different sizes. Irises of different people may be captured at different ranges of the camera under constrained conditions. When the eye or the iris is at a different ranges, the size of the iris in the image differs. Another artifact that results in deformation of the iris is dilation. The size of pupil and the iris changes because of illumination changes. When the light is brighter the iris is larger and the pupil is smaller than under low light conditions when the pupil is smaller and the iris is larger. Iris dilation also can result in a different shape to the iris. Usually, this type of change is uniform across the annular iris shape and normalization results in substantially the same data points being analyzed for an iris signature or code. Still another artifact that can change the acquired image is different perspective orientations. Any line-of-sight boundaries at the far side of a significantly rotated head, eye, and/or iris will result in a deformation of the iris or eye as an acquired image. FIG. 3C is an example of iris deformation due to different perspective orientations in the acquired image.

There are also instances where the iris is naturally deformed. Deformations may be slight or more dramatic. For example, there are cases where the iris is asymmetric. The pupil region is not always concentric within iris region, and is usually slightly nasal. This can be used as an additional discriminating feature for individuals. However, all textures or iris samples need to be placed into a single referenced shape for simplicity and to allow comparison from sample to sample. The normalization scheme used in one example embodiment preserves the discriminating features of deformed iris into a new presentation that can be compared to other samples, such as reference signatures that are previously captured.

In one example embodiment, normalization is conducted substantially simultaneously or during the segmentation process. In one embodiment of the invention, the normalization process is conducted as the iris segment is extracted from POSE technique. For instance, let $$S_\theta(r) = \int_{\Delta\theta} I_R(\theta, r) d\theta \quad (4.a)$$

be the 1D representation of the polar map at angle θ; For simplicity, we assume that uniform integration is used along the θ axis in (3.a). Then, the normalized signal is based on the interpolation/decimation of the signal in (4.a). The normalized output is stated as follows:

$$P_\theta(r) =^L \uparrow [^h \downarrow S_\theta(r)] \quad (4.b)$$

L is the desired dimension (i.e. number of rows) for the polar representation of the iris texture. The variable h varies based upon the deformation type and amount of degradations.

Once the information along the iris portion of the iris is obtained and normalized, the radial iris can be approximately modeled as a rubber sheet that stretches and contracts with the pupillary reflex, its texture and markings stretch and shrink accordingly. Thus a given iris, in different states of pupillary dilation on different occasions, should generate approximately the same iris signature or iris code. A second purpose served by this dimensionless coordinate system is that differences in the overall size of the iris image per se, due to image acquisition from different distances, will not change the computed iris code.

Having accurately defined the image area subject to analysis, the system then processes the data obtained from that area to generate the iris signature or iris identification code. As a result of using the dimensionless radial coordinate that simply measures off certain fractions of the distance from the inner boundary to the outer boundary of the iris, any given piece of iris tissue will always fall into the same zone of analysis, with the same position coordinates, regardless of how stretched or compressed the iris happens to be due to pupillary dilation. This dimensionless coordinate system exploits the fact that the stretching of the iris can be approximated as the stretching of a rubber sheet, so that its markings can still be recovered mathematically in undistorted form because the coordinate system is stretched an equal amount. As long as a relatively undistorted image of the iris is obtained, the texture of the iris is encoded into essentially the same iris signature or iris code, regardless of the degree of pupillary dilation, and regardless also of the overall size of the iris image.

In order to provide accurate recognition or identification of individual irises, one needs to extract the most discriminating information present in the polar presentation of the extracted iris. Only the significant features of the iris patterns are needed to be encoded so that comparisons between two subjects can be made more quickly and easily than comparing all the encoded bits. The encoding scheme is to generate data representing the image. From the data, a simpler template of few bits that captures the essence of iris patterns is generated. The extracted numeric code can then be used to compare it to multiple stored codes. In one embodiment, encoding the iris signature 610 includes applying an encoding algorithm such as wavelet or Gabor filters to extract textural information from images, such as the detailed patterns of the iris to produce a bit-wise template containing a number of bits of information and excluding some of the corrupt areas using masking within the iris pattern. The choice of the encoding filters is selected on the basis of achieving the best recognition rate and preserving the iris patterns in the limited generated bit-wise template. Regardless of the kind of filter selected, a quantized phasor is generated having more than two bits representing each pixel of the image. The most significant bit or bits of the quantized phasor information are prioritized by weighting the most significant bits with respect to the least significant bits. The most significant bits are used when matching an acquired sample to a previously stored sample. This scheme provides a quick way of matching subjects and also provides means to generate the most probable match instead of the best match when faced with poor quality iris images and iris patterns. For instance, an average weighting is used on the numeric code when matching using any of the information divergence measures. One of several types of information measure, including but not limited to a hamming code, a Euclidian code, a Jeffery code, a Kullback code, or any other standard information divergence measure can be used to provide the weighted distance. The difference is not on the choice made in the measure. The average weighted measure is emphasized in this example embodiment. More weight is distributed on the most significant bits versus lower bits. As a result a phasor value can be represented by 8 or 16 segments (2^N) rather than just 2 bits in other codes. The weights are distributed based upon the significance of the bit position.

The encoded iris signature or bit-wise iris code is then stored in a storage module 700 (shown in FIG. 1), as depicted by reference numeral 710 (shown in FIG. 2). In the case of a reference iris signature that will be stored for comparison to other samples gathered in the future, identifying information is linked to the reference iris signature. The reference iris signature or reference iris code is generally stored in a system that includes a storage back up scheme so that the reference iris signature can be stored indefinitely, or for whatever duration desired. The storage module 700 may also be communicatively coupled to a network of information storage devices. A sample iris signature or iris code is generally stored on a more temporary basis that can also be part of a storage module 700. The sample iris signature or iris code may be moved to an area or areas where the data associated with the sample is stored indefinitely. The sample iris signature or iris code will also be linked to other data, such as the location of where the sample was taken. In one embodiment, the iris recognition system and method can be used in security situations, such as at an airport. The image acquisition module 200 (shown in FIG. 1) can acquire an image near the beginning of a security checkpoint and a match or potential match can be determined by the iris recognition system and method before the person passes through the checkpoint.

After a sample image is acquired and a signature code or iris identification code is determined for the sample, the sample is compared to reference iris codes or iris signatures in the comparator module 800 (shown in FIG. 1), as depicted by reference numeral 810 (shown in FIG. 2). The comparator compares sample iris identification codes or sample iris signatures to reference iris identification codes or reference iris signatures. When the acquired image is incomplete or deformed, such as an image that would be rejected by other methods, the weighting of the most significant bits more heavily than the least significant bits allows the system 100 to generate the most probable matches instead of only the best match. The merit of this method is relevant for most of the iris at a distance capturing. The weighted divergence distance is irrelevant if a quality image is initially captured from a cooperative subject in a constrained/controlled environment.

If a person is identified as a probable match, the person can be asked to give a higher quality image in a constrained and controlled environment and the system can determine if there is an exact match.

The configuration method 900 can be applied to any system, including but not limited to selecting a storage configuration, selecting a hardware configuration, or selecting a software configuration. In one embodiment, the penalty cost rates are associated with data dependability specifications of a system. In some embodiments, the penalty cost rates are obtained from the user. Generally, the user is the one who can accurately supply this information; however, estimates can be based on libraries of penalty rates for different industry segments.

Hardware and Operating Environment

This section provides an overview of the example hardware and the operating environment in which embodiments of the invention can be practiced.

Figure 8:
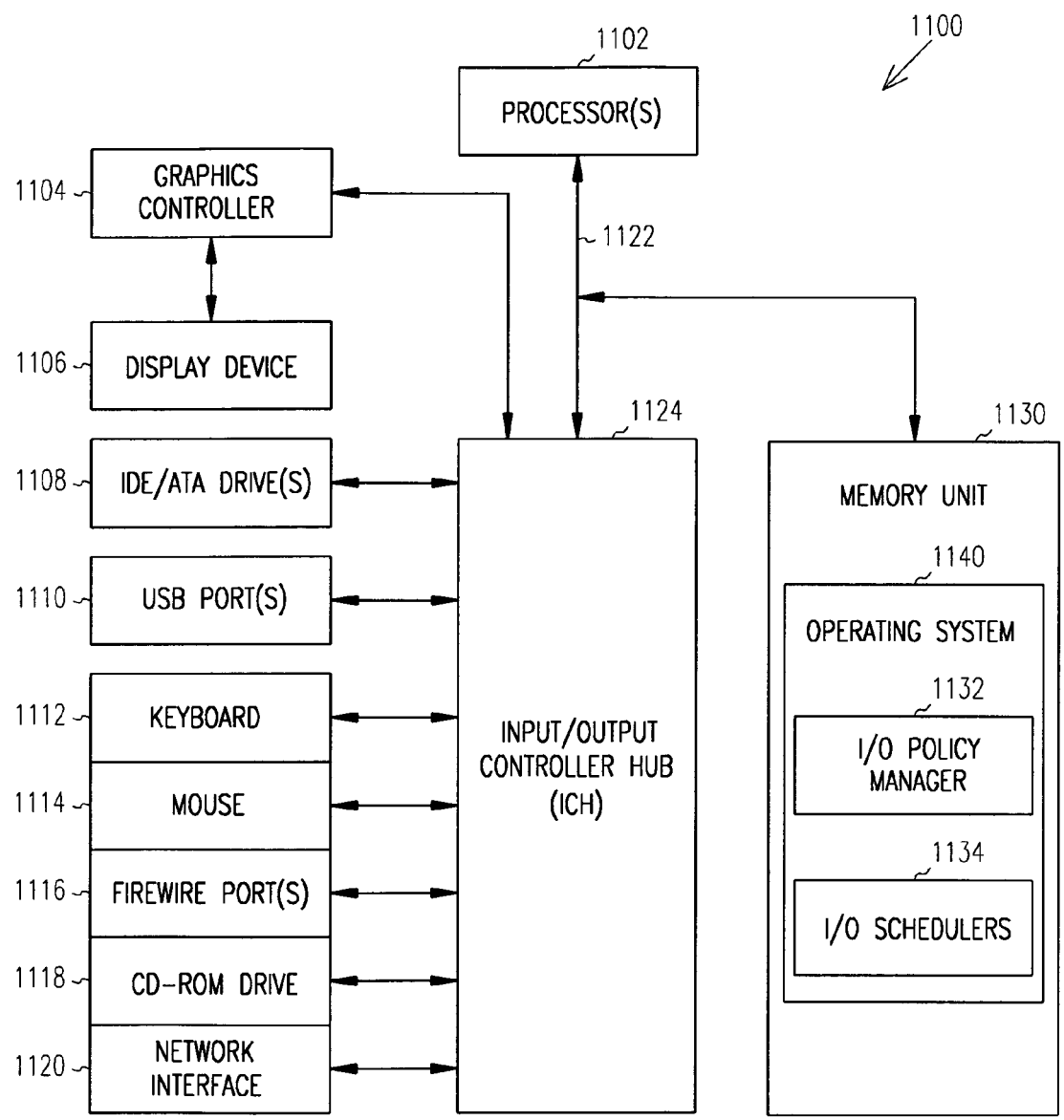
FIG. 8 illustrates an example computer system used in conjunction with certain example embodiments.

FIG. 8 illustrates an example computer system used in conjunction with certain embodiments of the invention. As illustrated in FIG. 10, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes IDE drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read-only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. The ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the disclosed subject matter. Accordingly, the specification and drawings are to be regarded in an illustrative rather than a restrictive sense.

The invention claimed is:

1. A method comprising:
    acquiring an image of an eye on a storage device;
    approximating the center of the pupil as a function of minimizing differences in a radial distance between the center of the pupil and a boundary of the pupil at a plurality of radial angles using a processor;
    using the approximated center of the pupil as the origin of a polar coordinate system;
    segmenting the image of an iris portion of the eye along a radial at an angle using a processor; and
    normalizing a number of data points from the iris portion along the radial at an angle using a processor.

2. The method of claim 1 further comprising analyzing data points from the iris portion of the radial at an angle to generate an iris signature associated with the data points from the iris portion using a processor.

3. The method of claim 2 further comprising comparing the iris signature to a previously generated reference iris signature using a processor.

4. The method of claim 2 wherein generating an iris signature further comprises encoding the data points from the iris portion.

5. The method of claim 4 further comprising comparing the encoded iris signature to a previously generated and encoded reference iris signature.

6. The method of claim 1 wherein approximating the center of the pupil further comprises:
identifying the pupil of the eye as a blob region; and
finding the center of mass of the blob region using a processor.

7. A method comprising:
acquiring an image of an eye using a processor;
approximating the center of the pupil using a processor;
identifying the pupil of the eye as a blob region using a processor; and
finding the center of mass of the blob region using a processor;
determining the radial distance between the center of mass of the blob region and a boundary of a pupil at a plurality of angles using a processor;
adjusting from the center of mass to a center of the pupil, wherein the center of the pupil is selected to minimize differences in the radial distance between the center of the pupil and the boundary of the pupil at the plurality of angles using a processor;
using the approximated center of the pupil as the origin of a polar coordinate system;
segmenting the image of an iris portion of the eye along a radial at an angle using a processor; and
normalizing a number of data points from the iris portion along the radial at an angle using a processor.

8. The method of claim 1 wherein segmenting the image of an iris portion of the eye along a radial at an angle, and normalizing a number of data points from the iris portion along the radial at an angle occur substantially simultaneously.

9. The method of claim 4 wherein encoding the data points from the iris portion includes:
generating a bit-wise template representing image data associated with the iris portion; and
weighting a number of most significant bits associated with the data points from the iris portion.

10. The method of claim 1 wherein acquiring an image of an eye includes acquiring an image where the iris is deformed.

11. A method comprising:
acquiring an image of an eye that includes an iris and a pupil using a processor;
establishing an origin of a polar coordinate system within the pupil of the image as a function of minimizing differences in a radial distance between a center of the pupil and a boundary of the pupil at a plurality of radial angles using a processor;
segmenting the image of an iris portion of the image along a radial, the radial having an endpoint at the origin using a processor; and
extracting information related to the iris portion of the image using a one dimensional analysis using a processor.

12. The method of claim 11 wherein the iris portion of the image is substantially non circular.

13. The method of claim 11 wherein a substantial portion of the iris portion of the image is occluded.

14. The method of claim 11 further comprising processing information related to the image of the eye that is localized to the portion of the image around the iris and the pupil.

15. The method of claim 11 further comprising processing information related to the iris portion of the image independent of a location of the center of the iris.

16. The method of claim 11 wherein segmenting the image of an iris portion of the image along a radial is done in a polar domain before detecting a border of the iris.

17. The method of claim 11 further comprising analyzing a number of data points from the iris portion of the radial to generate an iris signature associated with the data points from the iris portion using a processor.

18. The method of claim 17 further comprising comparing the iris signature to a previously generated reference iris signature using a processor.

19. The method of claim 17 wherein generating an iris signature further comprises encoding the data points from the iris portion.

20. The method of claim 17 further comprising normalizing a number of data points from the iris portion along the radial at an angle using a processor.

21. A method comprising:
acquiring an image of an eye that includes an iris and a pupil using a processor;
establishing an origin of a polar coordinate system at approximately the center of the pupil of the image using a processor, wherein the approximate center is determined as a function of minimizing differences in a radial distance between a center of the pupil and a boundary of the pupil at a plurality of radial angles; and
radially segmenting the iris portion of the image along a plurality of radials using a processor.

22. The method of claim 21 further comprising normalizing a number of data points from the iris portion along each of the plurality of radials using a processor.

23. The method of claim 22 wherein radially segmenting the iris portion of the image along a radial, and normalizing a number of data points from the iris portion along the radial occurs substantially simultaneously for a particular radial.

24. The method of claim 21 further comprising creating a identifier from a set of data associated with the iris portion of an image from one or more of the plurality of radials using a processor.

25. The method of claim 24 wherein creating an identifier includes generating a bit-wise template representing an image of the iris portion along one or more of the plurality of radials.

26. The method of claim 24 wherein creating an identifier includes weighting selected portions of a set of data associated with the iris portion of an image from one or more of the plurality of radials.

27. The method of claim 21 wherein establishing an origin of a polar coordinate system within the pupil of the image includes substantially centering the origin within the pupil of the image.

28. An apparatus comprising:
an image generator operating on hardware and configured to generate an image of an eye that includes at least a portion of an eye including a portion of a pupil, a portion of an iris and a portion of the sclera;
a polar segmentation module operating on hardware and communicatively coupled to the image generator and configured to receive the generated image produced by the image generator, the polar segmentation module to segment the portion of the iris from the received image wherein a center of the pupil is used as a center for such segmenting and wherein the center is determined as a function of minimizing differences in a radial distance between the center of the pupil and a boundary of the pupil at a plurality of radial angles; and
a data extraction and normalization module operating on hardware and communicatively coupled to the polar segmentation module and configured to receive the generated image from the polar segmentation module, the data extraction and normalization module to determine a portion of at least one radial that is associated with the iris using a one dimensional analysis of the generated image, extracting data from the portion and normalizing the data.

29. The apparatus of claim 28 comprising a polar coordinate origin generator communicatively coupled to the image generator to receive the generated image and to determine an origin for at least one radial used by the polar segmentation module.

30. The apparatus of claim 28, further comprising an encoding module communicatively coupled to the data extraction and normalization module to receive the normalized data and to encode the normalized data.

31. The apparatus of claim 30, further comprising;
a storage device coupled to the encoding module and configured to store previously obtained encoded data; and
a comparator module coupled to the encoding module and to the storage module to receive currently encoded data from the encoding module and the previously obtained encoded data from the storage module and to compare the currently encoded data to the previously obtained encoded data.

32. The apparatus of claim 28, further comprising;
a storage device coupled to the encoding module and configured to store previously obtained data; and
a comparator module coupled to the encoding module and to the storage module to compare currently obtained data from the data extraction and normalization module to the previously obtained data.

33. A computer-readable medium that provides instructions that, when executed by at least one processor of a computer system, cause the computer system to perform operations comprising:
acquiring an image of an eye that includes an iris and a pupil;
establishing an origin of a polar coordinate system within the pupil of the image, wherein the origin corresponds to a center of the pupil determined as a function of minimizing differences in a radial distance between the center of the pupil and a boundary of the pupil at a plurality of radial angles;
segmenting the image of an iris portion of the image along a radial, the radial having an endpoint at the origin; and
extracting information related to the iris portion of the image using a one dimensional analysis.

34. The computer-readable medium of claim 33 wherein acquiring an image of an eye that includes an iris and a pupil includes acquiring an image wherein the iris portion of the image is substantially non circular.

35. The computer-readable medium of claim 33 wherein acquiring an image of an eye that includes an iris and a pupil includes acquiring an image wherein a substantial portion of the iris portion of the image is occluded.

36. The computer-readable medium that provides instructions of claim 33 that, when executed by the at least one processor, further cause the computer system to perform operations comprising:
analyzing a number of data points from the iris portion of the radial; and generating an iris signature associated with the data points from the iris portion.

37. The computer-readable medium of claim 36 wherein generating an iris signature further comprises encoding the data points from the iris portion.

38. The computer-readable medium that provides instructions of claim 36 that, when executed by the at least one processor, further cause the computer system to perform operations comprising normalizing a number of data points from the iris portion along the radial at an angle.

39. The computer-readable medium that provides instructions of claim 36 that, when executed by the at least one processor, further cause the computer system to perform operations comprising comparing the iris signature to a previously generated reference iris signature.

* * * * *

UNITED STATES PATENT AND TRADEMARK OFFICE
CERTIFICATE OF CORRECTION

PATENT NO. : 7,756,301 B2  Page 1 of 1
APPLICATION NO. : 11/043366
DATED : July 13, 2010
INVENTOR(S) : Rida M. Hamza It is certified that error appears in the above-identified patent and that said Letters Patent is hereby corrected as shown below:

In column 1 after the title, please add the following paragraph:

Government Rights

This invention was made with Government support under Contract Number: **-*9971-***. The Government has certain rights in the invention.

Signed and Sealed this
Fourteenth Day of August, 2012

David J. Kappos
*Director of the United States Patent and Trademark Office*